(12) United States Patent  
Arrieta

(10) Patent No.: US 7,503,751 B2  
(45) Date of Patent: Mar. 17, 2009

(54) APPARATUS AND METHOD FOR ATTACHING A ROTOR BLADE TO A ROTOR

(75) Inventor: Hernan Victor Arrieta, Munich (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 10/544,754

(22) PCT Filed: Mar. 16, 2005

(86) PCT No.: PCT/DE2005/000471  
§ 371 (c)(1),  
(2), (4) Date: Dec. 19, 2006

(87) PCT Pub. No.: WO2005/095762  
PCT Pub. Date: Oct. 13, 2005

(65) Prior Publication Data  
US 2007/0081899 A1    Apr. 12, 2007

(30) Foreign Application Priority Data  
Mar. 29, 2004    (DE) .................. 10 2004 015 301

(51) Int. Cl.  
F01D 5/30    (2006.01)

(52) U.S. Cl. ................. 416/219 R; 29/889.21

(58) Field of Classification Search ............ 416/219 R, 416/220 R, 221, 248, 215–218; 29/889.21, 29/229.22  
See application file for complete search history.

(56) References Cited

U.S. PATENT DOCUMENTS

| 2,240,742 | A | * | 5/1941 | Allen ................. 416/216 |
| 2,255,486 | A | | 9/1941 | Doran |
| 3,045,968 | A | | 7/1962 | Willis |
| 4,460,315 | A | * | 7/1984 | Tseng et al. ........ 416/219 R |
| 5,310,318 | A | | 5/1994 | Lammas et al. |
| 5,474,421 | A | | 12/1995 | Rossmann |

FOREIGN PATENT DOCUMENTS

DE    196 03 388    7/1997  
FR        989 042    9/1951

* cited by examiner

Primary Examiner—Christopher Verdier  
(74) Attorney, Agent, or Firm—Crowell & Moring LLP

(57) ABSTRACT

An apparatus and method for attaching a rotor blade to a rotor, particularly for a gas turbine, is disclosed. The rotor blade has a blade vane and a blade root, such that the blade vane can be attached to or anchored in the rotor by the blade root. The blade root is configured asymmetrically, such that the front region of the blade root as seen in the direction of rotation of the rotor blade is provided with more anchoring teeth than a rear region of the blade root as seen in the direction of rotation of the rotor blade.

16 Claims, 1 Drawing Sheet

APPARATUS AND METHOD FOR ATTACHING A ROTOR BLADE TO A ROTOR

BACKGROUND AND SUMMARY OF THE INVENTION

This application claims the priority of International Application No. PCT/DE05/000471 filed Mar. 16, 2005, and German Patent Document No. 10 2004 015 301.9, filed Mar. 29, 2004, the disclosures of which are expressly incorporated by reference herein.

The invention relates to a rotor blade, particularly for a gas turbine.

Rotor blades of gas turbines are attached to a rotor of the gas turbine, particularly to rotor disks of the rotor, usually by blade roots, such that the blade roots engage in openings formed within the rotor or the rotor disk. The inner contour of the openings corresponds to the outer contour of the blade roots. The prior art essentially distinguishes two blade root configurations, i.e., the fir tree configuration and the dovetail configuration.

In the fir tree configuration, the cross-sectional contour of the blade root is characterized by a wave-shaped contour in both a front region of the rotor blade as seen in the direction of rotation and a rear region as seen in the direction of rotation, such that projections of this wave-shaped contour form a plurality of anchoring teeth in both of these regions. A corresponding opening within the rotor or the rotor disk into which the rotor blade may be inserted with the blade root has a complementary wave-shaped contour. A rotor blade with a fir tree configuration of this type is disclosed, for example, in the German publication DE 196 03 388 C1.

By contrast, in the dovetail configuration of the blade root, the cross-sectional contour is characterized by a continuous widening of the blade root from the radial outside to the radial inside, so that one anchoring tooth each is formed in both the front region and the rear region of the blade root as seen in the direction of rotation.

According to the prior art, both the fir tree configuration and the dovetail configuration for a blade root of a rotor blade are characterized by a symmetrical design of the blade root, i.e., by an equal number of anchoring teeth in both the front region and the rear region of the blade root as seen in the direction of rotation.

Based thereon, the object of the invention is to provide a novel rotor blade for a gas turbine and a corresponding gas turbine.

According to the invention, the blade root is designed asymmetrically, such that more anchoring teeth are associated with a front region of the blade root as seen in the direction of rotation than a rear region of the blade root as seen in the direction of rotation.

According to the present invention, an asymmetrical or non-symmetrical blade root design is proposed. It is distinguished in that the number of anchoring teeth provided in the front region of the blade root as seen in the direction of rotation differs from that in its rear region as seen in the direction of rotation. The axial length of the rotor and therefore also the weight of the rotor remains unchanged. The front region of the blade root as seen in the direction of rotation has a larger number of anchoring teeth than its rear region as seen in the direction of rotation. An asymmetrical blade root design of this type significantly reduces the tensile stresses that occur when the gas turbine is in operation and thus when the rotor and the rotor blade are rotating. This reduces the stresses acting on the blade root and increases the service life thereof.

According to a first advantageous embodiment of the invention, the front region of the blade root as seen in the direction of rotation has a fir tree configuration with two anchoring teeth and the rear region of the blade root as seen in the direction of rotation has a dovetail configuration with one anchoring tooth.

According to an advantageous second alternative embodiment of the invention, the front region of the blade root as seen in the direction of rotation has a fir tree configuration with a number of N anchoring teeth and the rear region of the blade root as seen in the direction of rotation has a fir tree configuration with a number of n anchoring teeth, such that the number N is greater than the number n.

BRIEF DESCRIPTION OF THE DRAWINGS

Preferred refinements of the invention are set forth in the description given below. An exemplary embodiment, which should not be construed as a limitation on the invention, will now be described in greater detail with reference to the drawings, in which.

DETAILED DESCRIPTION OF THE DRAWINGS

Before the rotor blade according to the invention is described in greater detail with reference to FIG. 2, a rotor blade according to the prior art will be described with reference to FIG. 1.

Figure 1:
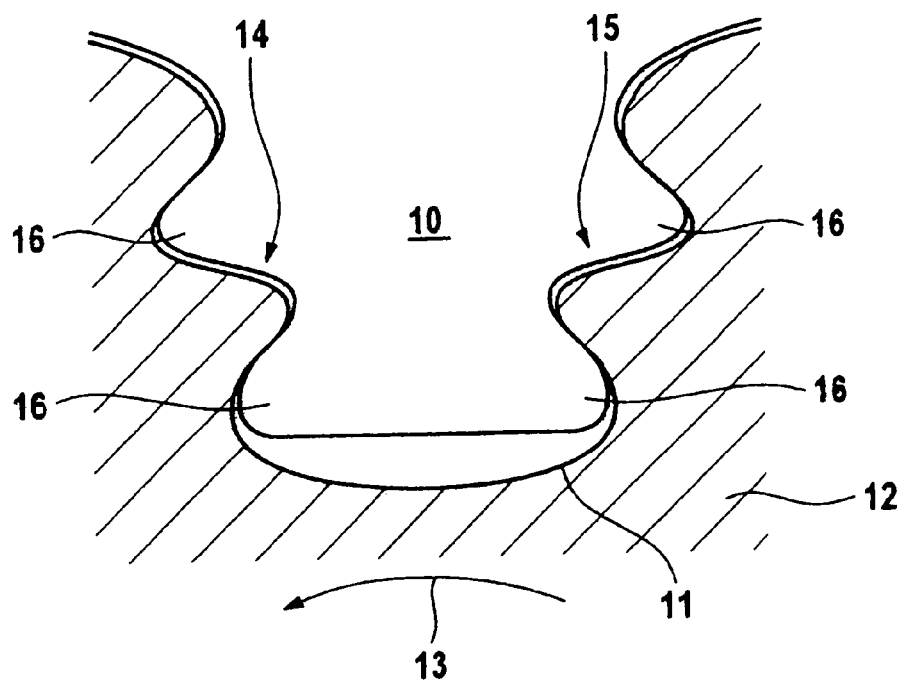
FIG. 1 shows a blade root of a rotor blade according to the prior art together with a detail of a rotor in cross-section.

FIG. 1 shows a blade root 10 of a rotor blade according to the prior art, with the blade root 10 fixed in an opening 11 of a rotor 12. In FIG. 1, an arrow 13 indicates the direction of rotation of the rotor 12 and hence the rotor blade.

The blade root 10 of the rotor blade according to the prior art depicted in FIG. 1 has what is referred to as a fir tree configuration. The blade root 10 has two anchoring teeth 16, respectively, in a front region 14 as seen in the direction of rotation (arrow 13) and a rear region 15 as seen in the direction of rotation. These anchoring teeth 16 engage in a correspondingly contoured opening 11 formed within the rotor 12 and thereby fix the rotor blade on the rotor 12 by the blade root 10. In the prior art, as may be seen in FIG. 1, an identical number of anchoring teeth 16 is associated with the front region 14 of the blade root 10 as seen in the direction of rotation (arrow 13) and its rear region 15 as seen in the direction of rotation. In the example shown, the blade root has two anchoring teeth 16 in each of the two regions 14 and 15.

Figure 2:
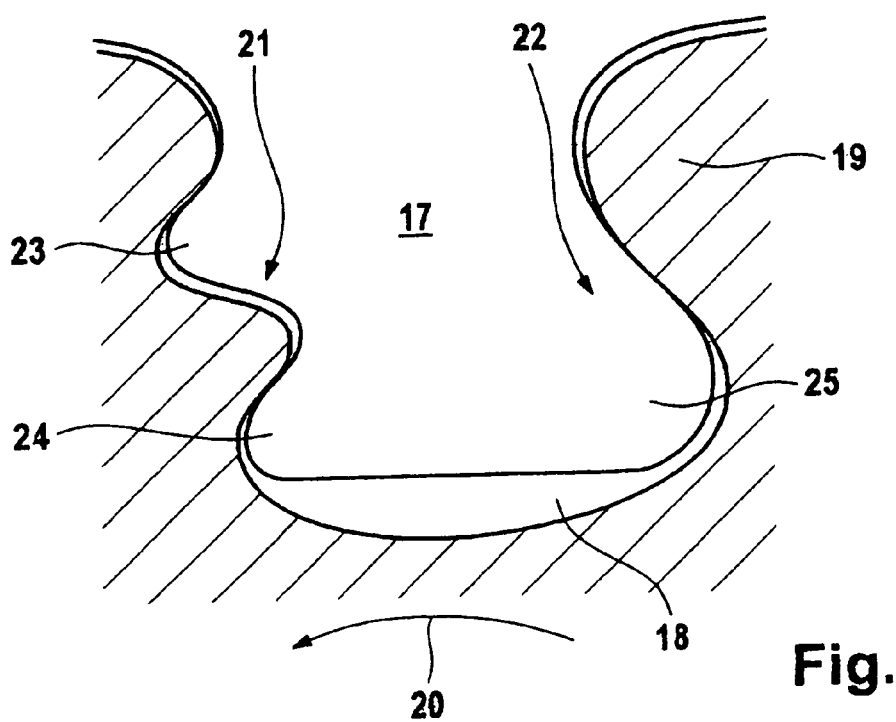
FIG. 2 shows a blade root of a rotor blade according to the invention together with a detail of a rotor in cross-section.

In contrast, FIG. 2 shows a rotor blade designed according to the invention, i.e., with a blade root 17 configured according to the invention, which is fixed in an opening 18 of a rotor 19. In FIG. 2, an arrow 20 again indicates a direction of rotation of the rotor 19 and hence the rotor blade.

In terms of the present invention, the blade root 17 of a rotor blade designed according to the invention features an asymmetrical or non-symmetrical configuration. The number of anchoring teeth in a front region 21 of the blade root 17 as seen in the direction of rotation (arrow 20) differs from that in a rear region 22 thereof as seen in the direction of rotation. The front region 21 as seen in the direction of rotation is the suction side while the rear region as seen in the direction of rotation is the pressure side of the blade. In terms of the present invention, the front region 21 of the blade root 17 as seen in the direction of rotation (arrow 20) has a larger number of anchoring teeth than its rear region 22 as seen in the direction of rotation. A blade root design of this type takes into account the forces acting on the rotor blade during rotation of the rotor 19 and hence the rotor blade. These are not only radially acting centrifugal forces that act on the rotor blade 17 and hence its blade root during rotation, but also circumferentially acting flow forces as well as inertial forces. The blade root design according to the invention takes this finding into account and makes it possible to significantly reduce the tensile stresses acting on the blade root. Thus, the blade root is subject to fewer stresses and has a longer service life.

In a preferred embodiment of the present invention, which is depicted in FIG. 2, the blade root 17 has a fir tree configuration with two anchoring teeth 23 and 24 in the front region 21 as seen in the direction of rotation and a dovetail configuration with one anchoring tooth 25 in the rear region 22 as seen in the direction of rotation. Accordingly, the blade root 17 has two anchoring teeth 23 and 24 in the front region 21 as seen in the direction of rotation and one anchoring tooth 25 in the rear region 22 as seen in the direction of rotation. This configuration of the blade root 17 is particularly preferred.

In contrast to the embodiment shown, the front region as seen in the direction of rotation may also be given a fir tree configuration with three anchoring teeth and the rear region of the blade root as seen in the direction of rotation a dovetail configuration with one anchoring tooth.

It is also possible to design the front region of the blade root as seen in the direction of rotation with a fir tree configuration with a number of N anchoring teeth and the rear region of the blade root as seen in the direction of rotation likewise with a fir tree configuration with a number of n anchoring teeth, such that the number N is greater than the number n. The number n can be N−1 or N−2, for example.

The present invention also provides a method for attaching a rotor blade to a rotor in a gas turbine engine and a method for assembling a gas turbine engine. The method for attaching a rotor blade to a rotor in a gas turbine engine includes fixing the blade root of the rotor blade within an opening defined by the rotor, where the blade root includes a front region with a first quantity of anchoring teeth and a rear region with a second quantity of anchoring teeth, where the first quantity is greater than the second quantity, and where the front region of the blade root has a fir tree configuration and the rear region of the blade root has a dovetail configuration. Alternatively, the front region of the blade root may have a fir tree configuration and the rear region of the blade root may have a fir tree configuration. The method for assembling the gas turbine engine includes attaching a rotor blade to a rotor where a blade root of the rotor blade is fixed within an opening defined by the rotor, where the blade root includes a front region with a first quantity of anchoring teeth and a rear region with a second quantity of anchoring teeth, where the first quantity is greater than the second quantity, and where the front region of the blade root has a fir tree configuration and the rear region of the blade root has a dovetail configuration. Alternatively, the front region of the blade root may have a fir tree configuration and the rear region of the blade root may have a fir tree configuration.

The present invention thus provides a rotor blade with an asymmetrically designed blade root. To this end, the blade root has a larger number of anchoring teeth in a front region as seen in the direction of rotation than in a rear region as seen in the direction of rotation. The front region as seen in the direction of rotation may have a fir tree configuration and the rear region as seen in the direction of rotation a dovetail configuration. It is also possible to design both regions with a fir tree configuration, such that the front region of the blade root as seen in the direction of rotation again has a larger number of anchoring teeth than the rear region as seen in the direction of rotation.

The rotor blade according to the invention may be a rotor blade for a turbine or a gas turbine compressor, preferably of an aircraft engine. The invention may also be used in stationary gas turbines, steam turbines and other turbines used for power generation.

The invention claimed is:

1. A rotor blade with a blade vane and a blade root, wherein the rotor blade can be attached to or anchored in a rotor by the blade root, wherein the blade root has an asymmetrical configuration, such that a front region of the blade root as seen in a direction of rotation of the rotor blade has more anchoring teeth than a rear region of the blade root as seen in the direction of rotation of the rotor blade, and wherein the front region of the blade root as seen in the direction of rotation has a fir tree configuration with two anchoring teeth and the rear region of the blade root as seen in the direction of rotation has a dovetail configuration with one anchoring tooth.

2. A rotor blade with a blade vane and a blade root, wherein the rotor blade can be attached to or anchored in a rotor by the blade root, wherein the blade root has an asymmetrical configuration, such that a front region of the blade root as seen in a direction of rotation of the rotor blade has more anchoring teeth than a rear region of the blade root as seen in the direction of rotation of the rotor blade, and wherein the front region of the blade root as seen in the direction of rotation has a fir tree configuration with two anchoring teeth and the rear region of the blade root as seen in the direction of rotation has a fir tree configuration with a number of N−1 anchoring teeth.

3. A rotor blade with a blade vane and a blade root, wherein the rotor blade can be attached to or anchored in a rotor by the blade root, wherein the blade root has an asymmetrical configuration, such that a front region of the blade root as seen in a direction of rotation of the rotor blade has more anchoring teeth than a rear region of the blade root as seen in the direction of rotation of the rotor blade, and wherein the front region of the blade root as seen in the direction of rotation has a fir tree configuration with a number of N anchoring teeth and the rear region of the blade root as seen in the direction of rotation has a fir tree configuration with a number of N−2 anchoring teeth.

4. The rotor blade as claimed in claim 1, wherein the rotor blade is a turbine rotor blade or a compressor rotor blade.

5. A gas turbine, with a rotor and a rotor blade associated with the rotor, wherein the rotor blade is fixed on the rotor by a blade root, wherein the blade root has an asymmetrical configuration, such that a front region of the blade root as seen in a direction of rotation of the rotor blade has more anchoring teeth than a rear region of the blade root as seen in the direction of rotation of the rotor blade, and wherein the front region of the blade root as seen in the direction of rotation has a fir tree configuration with two anchoring teeth and the rear region of the blade root as seen in the direction of rotation has a dovetail configuration with one anchoring tooth.

6. A rotor blade, comprising:
   a blade root, wherein the blade root includes a front region with a first quantity of anchoring teeth and a rear region with a second quantity of anchoring teeth, wherein the first quantity is greater than the second quantity, and wherein the front region of the blade root has a fir tree configuration and the rear region of the blade root has a dovetail configuration.

7. A rotor blade, comprising:
   a blade root, wherein the blade root includes a front region with a first quantity of anchoring teeth and a rear region with a second quantity of anchoring teeth, wherein the first quantity is greater than the second quantity, and wherein the front region of the blade root has a fir tree configuration and the rear region of the blade root has a fir tree configuration.

8. A gas turbine engine, comprising:
a rotor defining an opening therein; and
a rotor blade having a blade root, wherein the blade root is fixed within the opening defined by the rotor, wherein the blade root includes a front region with a first quantity of anchoring teeth and a rear region with a second quantity of anchoring teeth, wherein the first quantity is greater than the second quantity, and wherein the front region of the blade root has a fir tree configuration and the rear region of the blade root has a fir tree configuration.

9. A gas turbine engine, comprising:
a rotor defining an opening therein; and
a rotor blade having a blade root, wherein the blade root is fixed within the opening defined by the rotor, wherein the blade root includes a front region with a first quantity of anchoring teeth and a rear region with a second quantity of anchoring teeth, wherein the first quantity is greater than the second quantity. and wherein the front region of the blade root has a fir tree configuration and the rear region of the blade root has a fir tree configuration.

10. A method for attaching a rotor blade to a rotor in a gas turbine engine, comprising the step of:
fixing a blade root of the rotor blade within an opening defined by the rotor, wherein the blade root includes a front region with a first quantity of anchoring teeth and a rear region with a second quantity of anchoring teeth, wherein the first quantity is greater than the second quantity, and wherein the front region of the blade root has a fir tree configuration and the rear region of the blade root has a dovetail configuration.

11. A method for attaching a rotor blade to a rotor in a gas turbine engine, comprising the step of:
fixing a blade root of the rotor blade within an opening defined by the rotor, wherein the blade root includes a front region with a first quantity of anchoring teeth and a rear region with a second quantity of anchoring teeth, wherein the first quantity is greater than the second quantity, and wherein the front region of the blade root has a fir tree configuration and the rear region of the blade root has a fir tree configuration.

12. A method for assembling a gas turbine engine, comprising the step of:
attaching a rotor blade to a rotor wherein a blade root of the rotor blade is fixed within an opening defined by the rotor, wherein the blade root includes a front region with a first quantity of anchoring teeth and a rear region with a second quantity of anchoring teeth, wherein the first quantity is greater than the second quantity, and wherein the front region of the blade root has a fir tree configuration and the rear region of the blade root has a dovetail configuration.

13. A method for assembling a gas turbine engine, comprising the step of:
attaching a rotor blade to a rotor wherein a blade root of the rotor blade is fixed within an opening defined by the rotor, wherein the blade root includes a front region with a first quantity of anchoring teeth and a rear region with a second quantity of anchoring teeth, wherein the first quantity is greater than the second quantity, and wherein the front region of the blade root has a fir tree configuration and the rear region of the blade root has a fir tree configuration.

14. A rotor blade, comprising:
a blade root, wherein the blade root includes a front region with a first configuration and a rear region with a second configuration and wherein the first configuration is a fir tree configuration and the second configuration is a dovetail configuration.

15. A rotor blade, comprising:
a blade root, wherein the blade root includes a front region with a first configuration and a rear region with a second configuration and wherein the first configuration is a fir tree configuration with two teeth and the second configuration is a fir tree configuration with one tooth.

16. The rotor blade as claimed in claim 14, wherein the first configuration has more anchoring teeth than the second configuration.

* * * * *